United States Patent
Konoe et al.

(10) Patent No.: US 6,336,861 B1
(45) Date of Patent: Jan. 8, 2002

(54) GAME MACHINE AND INFORMATION STORAGE MEDIUM

(75) Inventors: Yutaka Konoe; Yosuke Kuroda, both of Yokohama (JP)

(73) Assignee: Namco, Ltd., Tokyo (JP)

(*) Notice: Subject to any disclaimer, the term of this patent is extended or adjusted under 35 U.S.C. 154(b) by 0 days.

(21) Appl. No.: 09/555,405

(22) PCT Filed: Oct. 1, 1999

(86) PCT No.: PCT/JP99/05419

§ 371 Date: Jul. 7, 2000

§ 102(e) Date: Jul. 7, 2000

(30) Foreign Application Priority Data

Oct. 2, 1998 (JP) ............................................. 10-296073

(51) Int. Cl.⁷ ................................................ A63F 13/00
(52) U.S. Cl. .............................. 463/23; 463/24; 463/29
(58) Field of Search .............................. 463/1, 23, 24, 463/25, 29, 2, 3, 4, 6, 7, 9

(56) References Cited

U.S. PATENT DOCUMENTS 4,738,451 A * 4/1988 Logg ............................ 463/23
4,858,930 A * 8/1989 Sato ............................. 463/23
5,370,399 A * 12/1994 Liverance ..................... 463/23

FOREIGN PATENT DOCUMENTS

| JP | A-7-227479 | 8/1995 |
| JP | A-9-173635 | 7/1997 |

* cited by examiner

Primary Examiner—Jessica J. Harrison
(74) Attorney, Agent, or Firm—Oliff & Berridge, PLC

(57) ABSTRACT

The objective of the present invention is to provide a game machine and information storage medium that make it possible to encourage players who have selected multi-player mode to continue playing. The maximum number of game stages that can be cleared by players in multi-player mode is set to be greater than the maximum number of game stages that can be cleared by a player in single-player mode. In single-player mode, the game is over at the point at which each course is cleared. In multi-player mode, a continuation privilege in the next course (a course that is more difficult) is granted when the current course is cleared. The privilege to continue playing the next course is granted to the player with the higher score, and is also given at a certain probability to the player with the lower score. The player who was not granted the play continuation privilege is allowed to continue playing on condition that a coin is paid, and also an encouragement screen is displayed to induce this payment for play continuation.

26 Claims, 14 Drawing Sheets

FIG.10

| DIFFERENCE VPD BETWEEN WON POINTS (WON POINTS FOR P1 − WON POINTS FOR P2) | 4 | 3 | 2 | 1 | 0 | -1 | -2 | -3 | -4 |
|---|---|---|---|---|---|---|---|---|---|
| PROBABILITY LP1 THAT P1 WILL BE GRANTED THE PLAY CONTINUATION PRIVILEGE | 0.9 | 0.8 | 0.7 | 0.6 | 0.5 | 0.4 | 0.3 | 0.2 | 0.1 |
| PROBABILITY LP2 THAT P2 WILL BE GRANTED THE PLAY CONTINUATION PRIVILEGE | 0.1 | 0.2 | 0.3 | 0.4 | 0.5 | 0.6 | 0.7 | 0.8 | 0.9 |

GAME MACHINE AND INFORMATION STORAGE MEDIUM

TECHNICAL FIELD

The present invention relates to a game machine and information storage medium for a multi-player type of game that a plurality of players can play.

BACKGROUND ART

Various game machines for a multi-player type of game have been developed and marketed in the past to enable a plurality of player to enjoy the game. With such a game machine, a player can enjoy a game of while either competing against another player or cooperating therewith, and so these games are popular with players.

With this type of game machine, it is usual to have a single-player mode for when only one player has inserted a coin, in contrast to a multi-player mode for when a plurality of players have inserted coins (or fee in the broadest sense) simultaneously. Players with better game skills play in single-player mode rather than multi-player mode. Further, the play of players in single-player mode is elaborated and also more full of strategy, whereas the play of players in multi-player mode is more clumsy. This means that, for the same amount of time that each player is engrossed in the game machine, the utilization ratio (the rate of return on the payment) of the game machine in multi-player mode is greater than that in single-player mode. In order to increase the utilization ratio of the game machine, therefore, it is desirable to devise some means of encouraging players who have selected multi-player mode to play for longer.

DISCLOSURE OF INVENTION

The present invention was devised in the light of the above described technical problem and has as an objective thereof the provision of a game machine and information storage medium that make it possible to encourage players who have selected multi-player mode to continue playing.

In order to solve the above described technical problem, an aspect of the present invention relates to a game machine for a multi-player type of game that enables a plurality of players to play, the game machine comprising: means for performing a game computation, based on operation data that a player inputs by using an operation means; means for generating at least one of a game image and a game sound in accordance with the game computation; and means for making a maximum number of game stages that can be cleared by players in a multi-player mode played by a plurality of players greater than a maximum number of game stages that can be cleared by a player in a single-player mode played by a single player.

With this aspect of the invention, the maximum number of game stages that can be cleared by a player in single-player mode is less than that in multi-player mode. It is therefore possible to prevent a situation in which a player occupies the game machine for a long time in single-player mode, which tends to happen when a player with superior game skills plays in a complicated manner. In this aspect of the invention, the maximum number of game stages that can be cleared by players is greater in multi-player mode than in single-player mode. It is therefore possible to induce players to continue playing in multi-player mode, which tends to be clumsily used by players with poorer game skills. As a result, it is possible to increase the effective utilization ratio of the game machine, as one example of the advantages thereof.

In the present invention, when game stages are divided into a plurality of groups of game stages: in single-player mode, a game may be over for a player at a point at which one group of game stages from among a plurality of groups of game stages is cleared; and in multi-player mode, a continuation privilege that may enable a continuation of play in a next group of game stages is granted to at least one player among a plurality of players, when one group of game stages from among a plurality of groups of game stages has been cleared. This configuration makes it possible to end the game when each group of game stages has been cleared in single-player mode, but enable players to continue playing the next group of game stages when in multi-player mode. It is therefore possible to implement a method that increases the maximum number of game stages in multi-player mode in comparison to single-player mode, in a simple manner.

In the present invention, the next group of game stages may have a higher degree of difficulty than the one group of game stages. This makes it possible to quickly end the playing of the next group of game stages that is granted as a continuation privilege to a player.

In the present invention, a continuation privilege that enables the continuation of play in a next group of game stages may be granted to a player who has superior game results among the plurality of players. This configuration makes it possible to prevent a situation that feels unnatural to the player.

In the present invention, the game play continuation privilege may be also granted to a player who has inferior game results among the plurality of players, with a given probability. This makes it possible to prevent a situation in which players with inferior game results lose the desire to play.

In the present invention, a continuation privilege that enables the continuation of play in the next group of game stages may be granted to at least one player among a plurality of players, a continuation privilege that enables the continuation of play in the next group of game stages is not granted to another player, and game play is allowed to continue for the other player on condition that a fee is paid. This configuration enables other players to expect to continue playing the next group of game stages, on the payment of a fee. As a result, it is possible to cancel any drop in the utilization ratio of a game machine in which continuation privileges are granted, by allowing players who have not been granted this continuation privilege to pay a fee.

In the present invention, an encouragement screen may be displayed to the other player who has not been granted the continuation privilege that enables the continuation of play in the next group of game stages, to induce a payment of a fee. This makes it possible to induce a player who has not been granted the continuation privilege to continue playing, increasing the possibility that large numbers of players will play again.

BRIEF DESCRIPTION OF DRAWINGS

FIG. 10 shows an example of a table for obtaining probabilities for granting the play continuation privilege for the next course to players 1 and 2;

BEST MODE FOR CARRYING OUT THE INVENTION

Preferred embodiments of the present invention are described below with reference to the accompanying drawings. Note that, although the description below relates to an example in which the present invention is applied to a variety game pack that enables a player to play a plurality of mini-games, the applications of the present invention are not specifically limited thereto. Similarly, the description below relates to a game machine that enables two players to play, but the present invention is not limited thereto and can equally well apply to a game machine that enables three or more players to play.

1. Configuration

Figure 1:
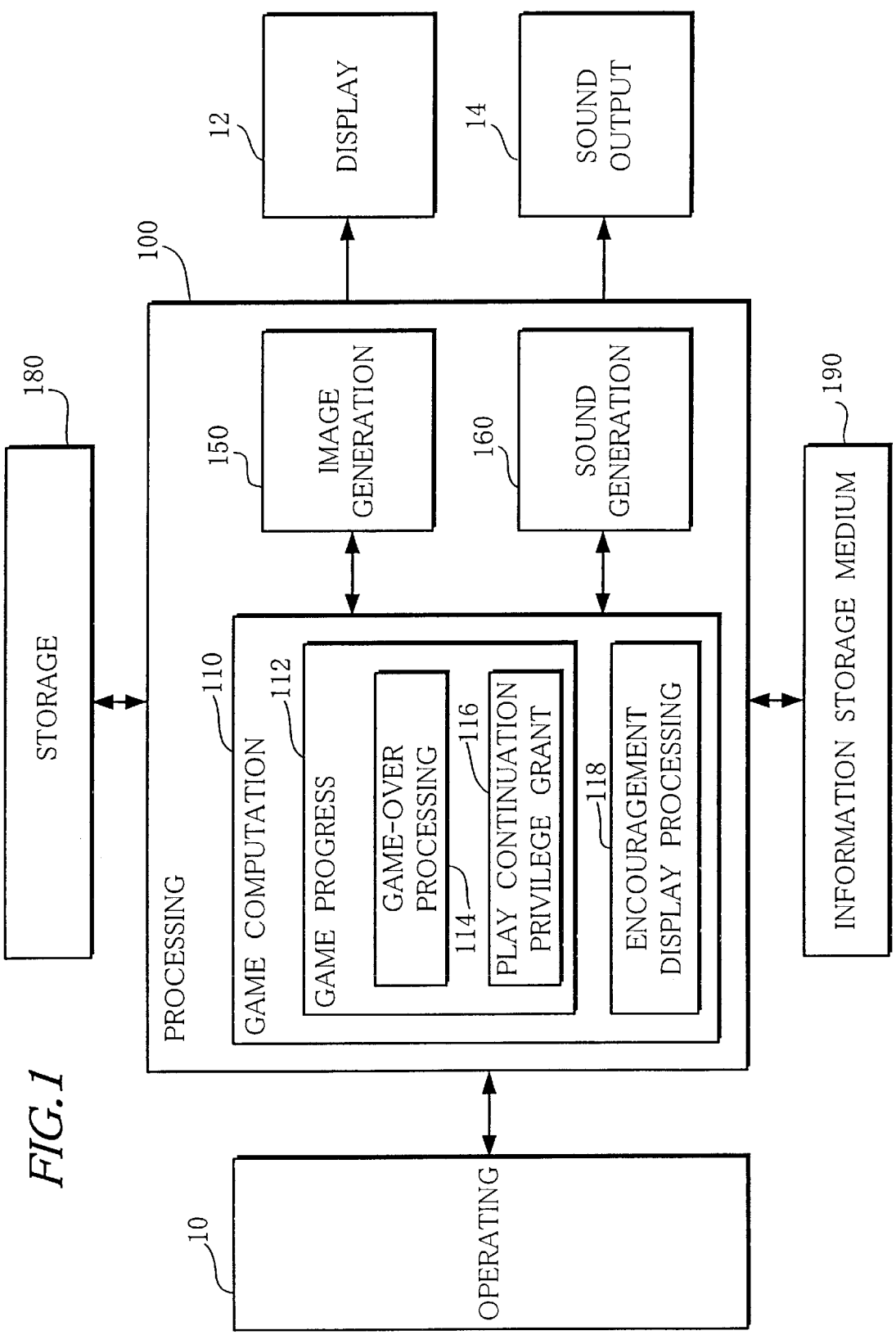
FIG. 1 shows an example of a functional block diagram of a game machine in accordance with an embodiment of the present invention.

An example of a functional block diagram of the game machine of this embodiment is shown in FIG. 1.

In this example, an operating section 10 enables a player to input operation data by operating controls such as a joystick, buttons, a shooting device (an input device that simulates a gun or the like), a steering wheel, or an accelerator pedal, and the operation data obtained by the operating section 10 is input to a processing section 100.

The processing section 100 to executes various types of processing, such as controlling the entire game machine, issuing instructions to the various blocks within the device, and game computations, where the functions thereof can be implemented by hardware such as a CPU (either CISC or RISC), a DSP, or an ASIC (such as a gate array) and by a given program (game program).

A storage section 180 acts as a work area for the processing section 100, for example, where the functions thereof can be implemented by hardware such as RAM.

An information storage medium (a storage medium that enables the reading of information therefrom by a computer) 190 stores a program and data. The functions of this information storage medium 190 can be implemented by hardware such as an optical disk (CD-ROM or DVD), a magneto-optical disk (MO), a magnetic disk, a hard disk, magnetic tape, a game cassette, an IC card, or semiconductor memory. The processing section 100 executes the various processings, based on the program and data stored in this information storage medium 190.

Note that all or part of the information stored in the information storage medium 190 is transferred to the storage section 180 at a suitable time, such as when the device is switched on.

The processing section 100 comprises a game computation section 110, an image generation section 150, and a sound generation section 160.

In this case, the game computation section 110 executes processing for setting a game mode; processing for moving the game forward; processing for setting selection screens; processing for determining the position and direction of a moving body (such as a character, robot, vehicle, tank, aircraft, spaceship, ship, speedboat, ski, surfboard, ball, or bullet); processing for determining the viewpoint position and line of-sight direction; processing for reproducing the motion of a moving body; processing for disposing an object within an object space; hit check processing; processing for calculating game score (results); or processing for enabling a plurality of players to play in a common game space, based on factors such as operation data from the operating section 10 and a game program.

The image generation section 150 generates game images in accordance with computations performed by the game computation section 110. The images generated by the image generation section 150 are displayed on a display section 12.

The sound generation section 160 generates game sounds in accordance with computations performed by the game computation section 110. The game sounds generated by the sound generation section 160 are output by a sound output section 14.

The game computation section 110 comprises a game progress section 112 and an encouragement display processing section 118. The game progress section 112 comprises a game-over processing section 114 and a play continuation privilege grant section 116.

In this case, the game progress section 112 executes processing to move the game forward. In other words, it performs processing to display a course (degree of difficulty) selection screen and a game stage selection screen, game stage calculation processing for determining whether or not the players have cleared a game stage, and game-over processing when the players have satisfied a game-over condition.

The game progress section 112 of this embodiment of the invention performs processing for making the maximum number of game stages that can be cleared by players in multi-player mode greater than the maximum number of game stages that can be cleared by a player in single-player mode.

More specifically, at the point at which one course out of a plurality of courses (or group of game stages in the broadest sense) has been cleared in single-player mode, the game-over processing section 114 of the game progress section 112 ends the game for the player. When one course out of a plurality of courses has been cleared in multi-player mode, on the other hand, the play continuation privilege grant section 116 of the game progress section 112 performs processing to grant a continuation privilege to at least one player among a plurality of players, to allow that player to continue playing the next course. With such a configuration, only a limited number of game stages in each course can be played in single-player mode, but in multi-player mode it is possible to play the next course when one course has been cleared. Thus the maximum number of game stages that can be cleared by players is greater in multi-player mode than in single-player mode. As a result, it is possible to induce players who have selected multi-player mode to play for a longer time.

The encouragement display processing section 118 performs processing to display a proposition that induces a player who has not been granted the privilege to continue playing the next course of the game by the play continuation privilege grant section 116 to pay a coin (or fee in the broadest sense) in order to continue playing the game. The display of such a encouragement display enables an increase in the possibility that more people will play the next course.

Note that the game machine of this embodiment is configured to enable both games in a single-player mode that are played by one player and games in a multi-player mode that are played by a plurality of players.

When a plurality of players are playing, the game images and game sounds that are supplied to these players could be generated by using one game machine, or they could be generated by using a plurality of game machines that are connected by means such as transmission lines or communication lines.

2. Outline of Game

The description now turns to an outline of a game that is implemented by this embodiment of the invention, with reference to examples of game images shown in FIGS. 2A to 5B.

Figure 2A:
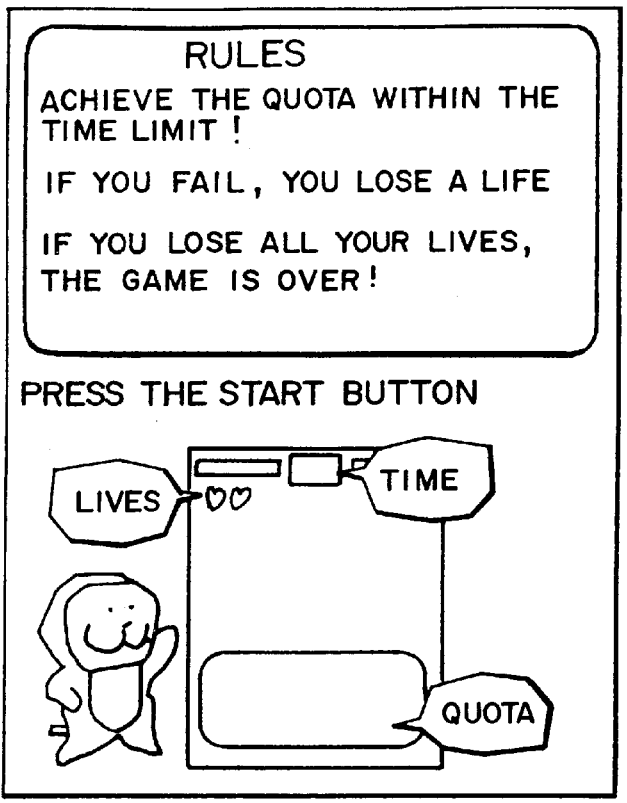
FIGS. 2A and 2B show examples of game images that are generated by this embodiment.

When a player inserts a coin (or fee in the broadest sense), screen that explains the rules of the game is first displayed, as shown in FIG. 2A. In the variety game pack of this embodiment, each player is required to achieve a quote within a certain time, and the number of lives held by that player is decreased by one if that quota is not achieved. When the number of lives reaches zero, the game is over for that player.

Figure 2B:
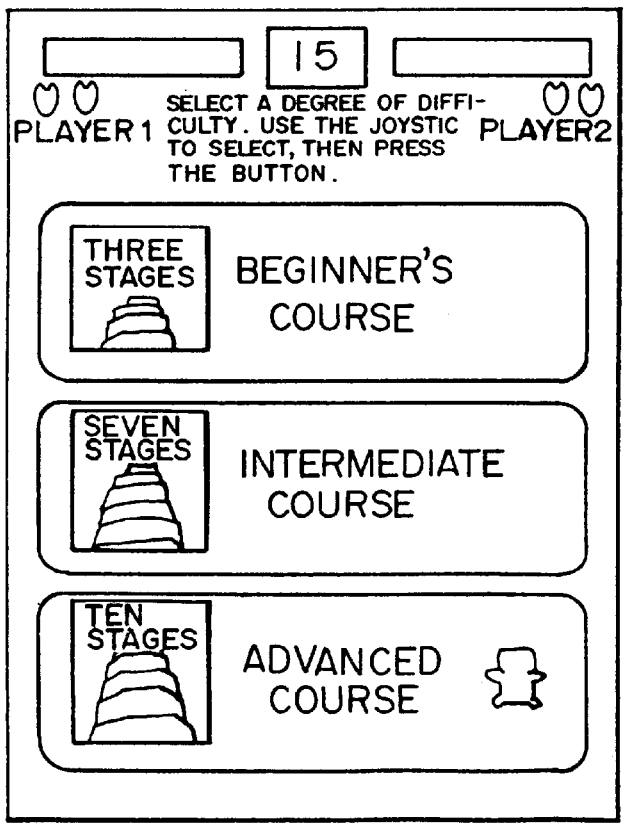

When the player presses a start button, a course (degree of difficulty) selection screen is displayed, as shown in FIG. 2B. This variety game pack is set up in such a manner that players can select any one of a beginners' course that has the lowest degree of difficulty, an intermediate course that has a medium degree of difficulty, or an advanced course that has the greatest degree of difficulty.

Figure 3A:
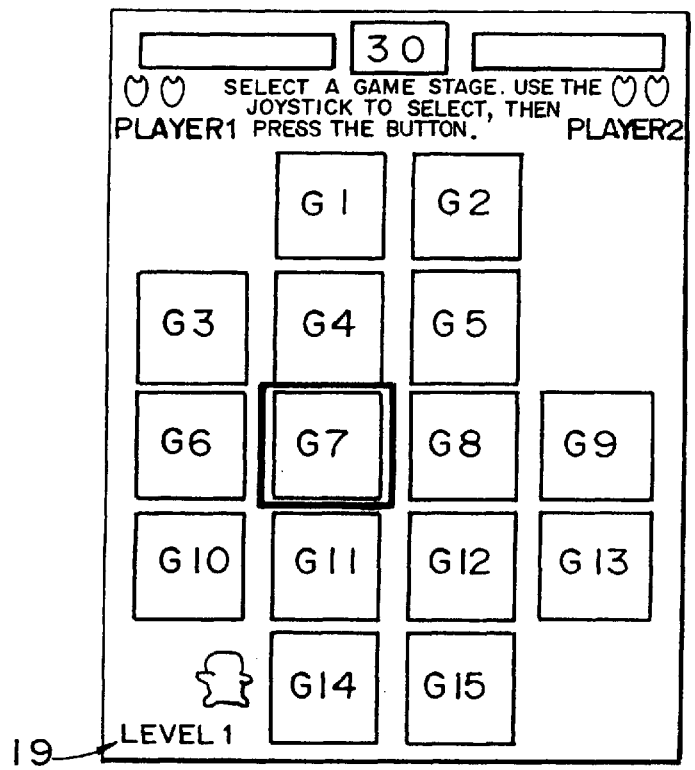
FIGS. 3A and 3B show further examples of game images generated by this embodiment.

When the players select a course, a game stage (mini-game) selection screen is displayed, as shown in FIG. 3A. While viewing the game stage selection screen, the players use means such as a joystick or button to select a desired game stage (G7 is selected in FIG. 3A) from among a plurality of game stages (selection branches G1 to G15).

Figure 3B:
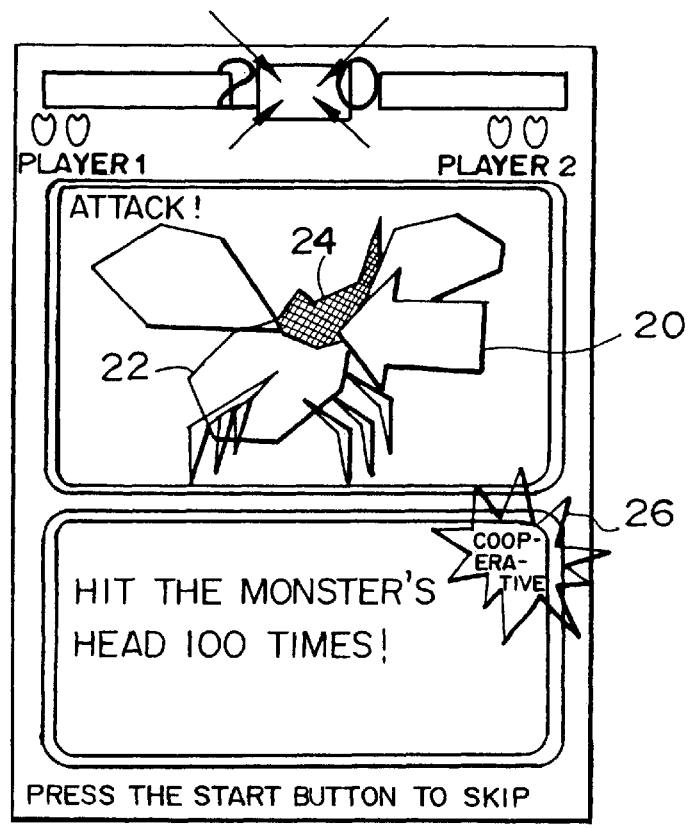

Once the players have selected a game stage, a screen explaining the conditions for clearing the selected game stage (an instruction mode screen) is displayed, as shown in FIG. 3B. The requirement is to attack a head 24 of a monster 22, as indicated by an arrow 20 in FIG. 3B. When 100 shots hit the head 24 of the monster 22, the condition for clearing that game stage is satisfied. Two players can clear this game stage by playing cooperatively, as indicated by a display 26. In other words, the variety game pack of this embodiment contains a mixture of 10 cooperative-play game stages and versus-play (competitive) game stages. In a cooperative-play game stage, the two players achieve the quota they are given by cooperating with each other. In a versus-play game stage, on the other hand, the two players achieve the quota they are given by competing against each other.

Figure 4A:
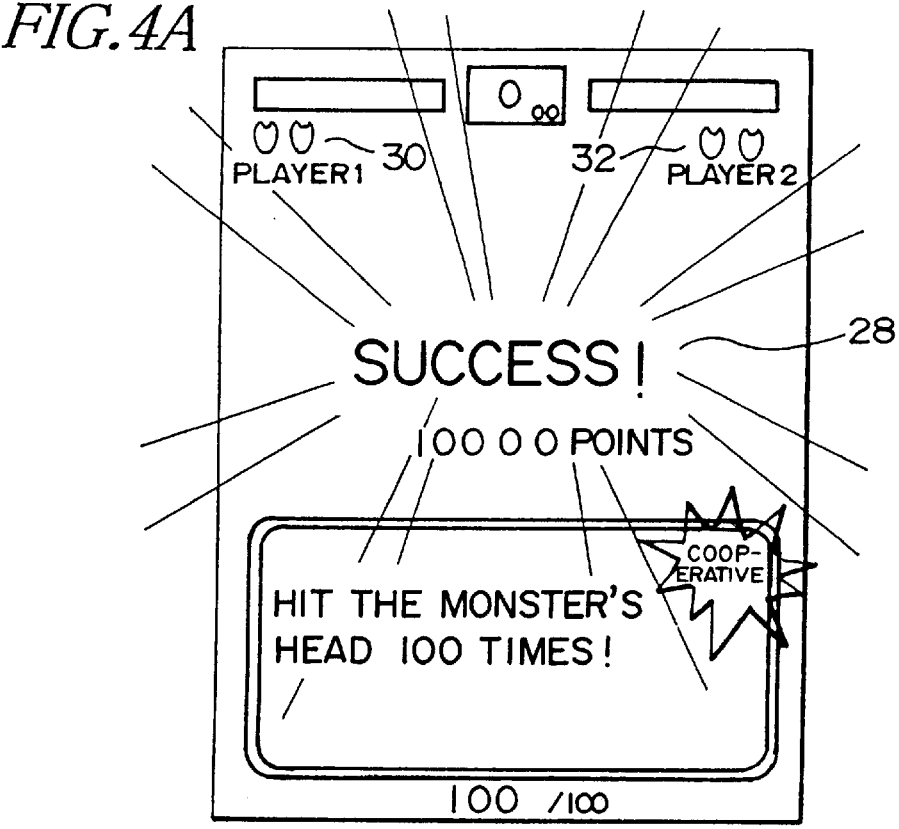
FIGS. 4A and 4B show still further examples of game images generated by this embodiment.
Figure 4B:
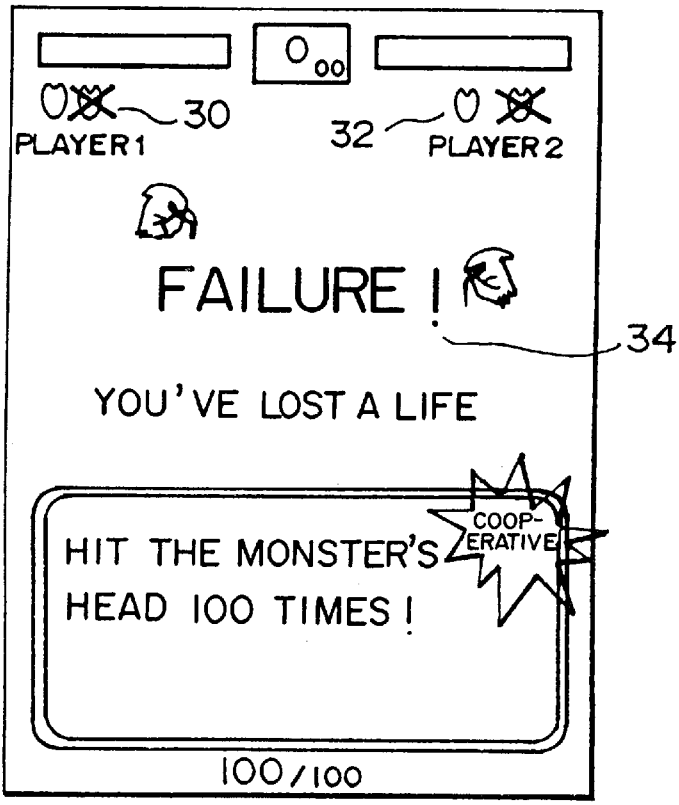

After the display of the screens that explain the conditions for clearing the game stage, the players start playing the game in that game stage. When they succeed in achieving the quota (when they succeed in clearing the game stage), a quota achieved display 28 appears on the screen, as shown in FIG. 4A. In this case, the numbers of lives left to each of players 1 and 2 does not drop, as shown by life displays 30 and 32. When they fail to achieve the quota (when they fail to clear the game stage), on the other hand, a quota failed display 34 appears on the screen, as shown in FIG. 4B. In this case, the number of lives left to players 1 and 2 are both reduced by 1, as shown by the life displays 30 and 32. This means that players 1 and 2, who each had two lives initially, are reduced to one life each.

Figure 5A:
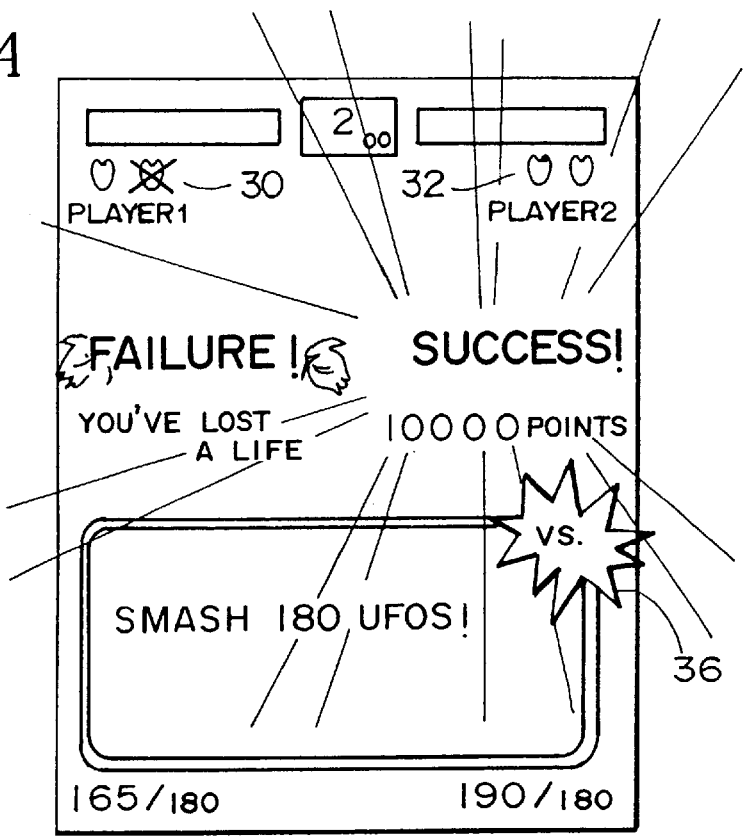
FIGS. 5A and 5B show even further examples of game images generated by this embodiment.

With VS. (versus) play, on the other hand, the number of lives is reduced for a player who fails to achieve the quota (or the player who loses), but the number of lives is not reduced for a player who succeeds in achieving the quota (or the player who wins). A display 36 as shown in FIG. 5A by way of example indicates VS. play. Since player 1 failed to achieve the quota, the number of lives indicated by the life display 30 is reduced by one. Since player 2 has succeeded in achieving the quota, the number of lives indicated by the life display 32 is not reduced. In this case, it is also possible to reduce by one the quota of the player who lost by shooting down a smaller number of enemies and increase by one the quota of the player who won by shooting down a larger number of enemies, for example, regardless of whether they succeeded or failed in achieving the quota.

Figure 5B:
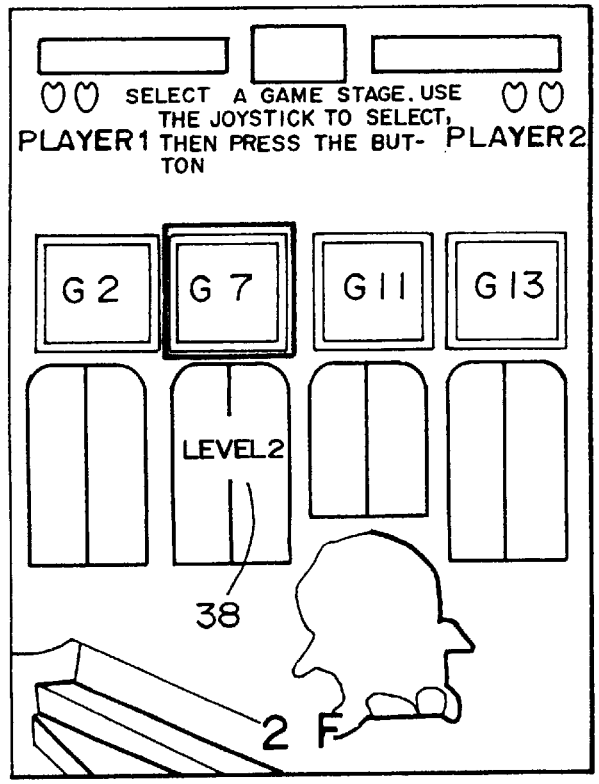

When the above described play in one game stage has ended, the next game stage selection screen is displayed as shown in FIG. 5B. When the players again select a game stage, play in the next game stage starts. If the players succeed in clearing that game stage, the numbers of lives are not reduced, but if they fail the numbers of lives are reduced. When a number of lives reaches zero, the game is over for that player, unless a coin (fee) is paid. When all of the game stages of the course are cleared while the number of lives does not reach zero, that course is cleared. In this game, the course is cleared by completing three game stages for the beginners' course, seven game stages for the intermediate course, or ten game stages for the advanced course, as shown in FIG. 2A.

Figure 6A:
FIGS. 6A and 6B show yet further examples of game images generated by this embodiment.
Figure 6B:
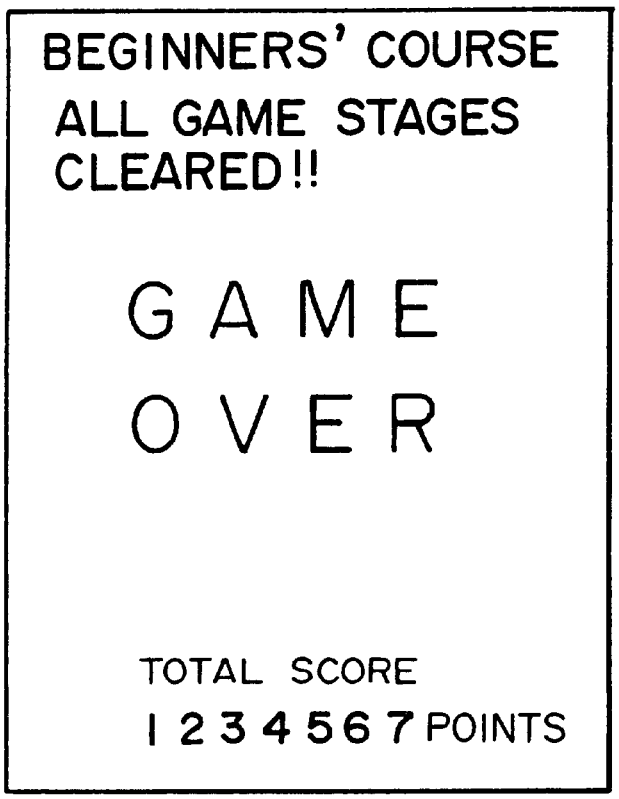

When all of the game stages in the course have been cleared in single-player mode with this embodiment, as shown in FIG. 6A, the game is over for the player, as shown in FIG. 6B.

Figure 7A:
FIGS. 7A and 7B show even more examples of game images generated by this embodiment.
Figure 7B:
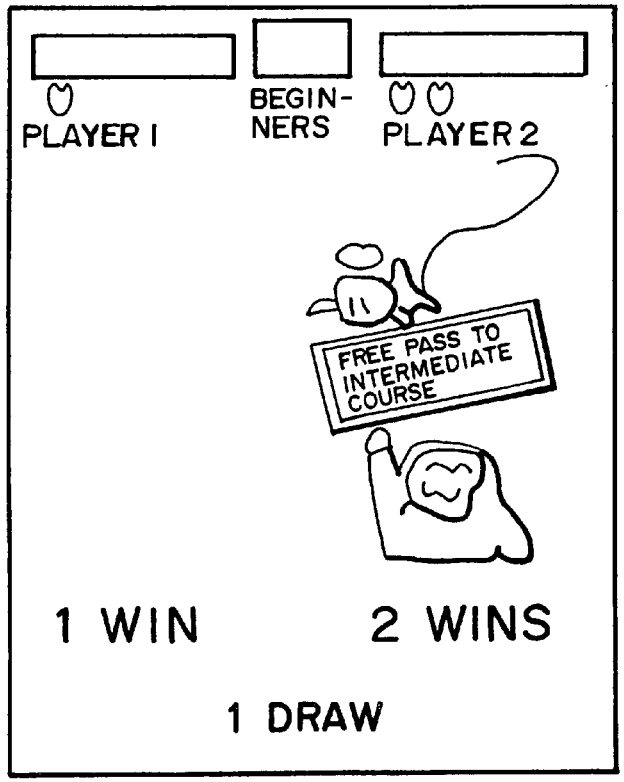

When all of the game stages in the course have been cleared in multi-player mode as shown in FIG. 7A, on the other hand, one player (or even both players) such as a player with a superior game score is granted a privilege that enables the continuation of play in the next course, as shown in FIG. 7B. In other words, in contrast to the end of the game for the player in FIG. 6B, player 2 in FIG. 7B can play once again from the initial game stage of the next intermediate course, without having to insert a coin.

3. Characteristics of this Embodiment

This embodiment of the invention is characterized in that the maximum number of game stages that can be cleared by players in multi-player mode is greater than the maximum number of game stages that can be cleared by a player in single-player mode.

Figure 8:
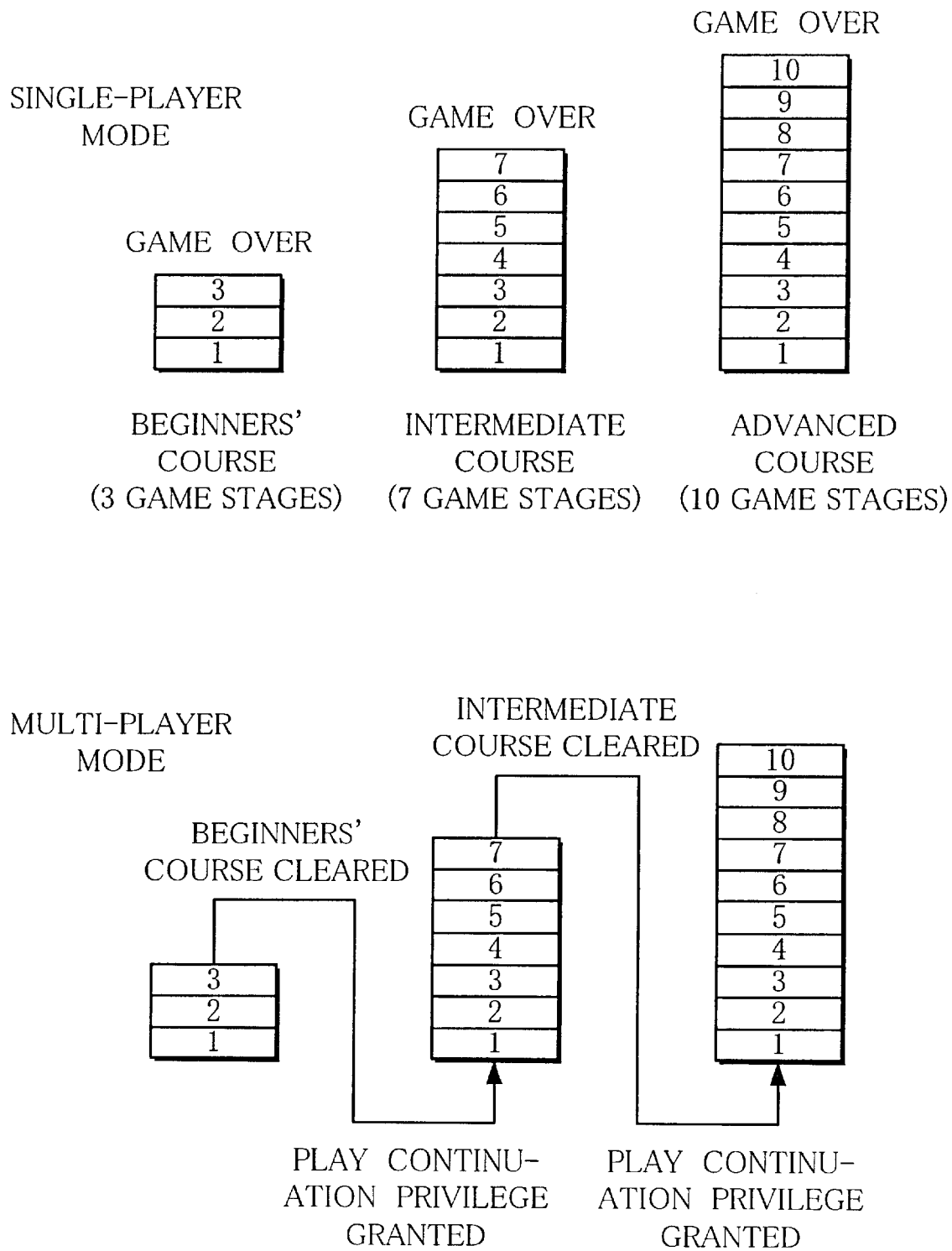
FIG. 8 is illustrative of a characteristic of this embodiment.

In other words, the game is forcibly ended for the player in single-player mode after three game stages in the beginners' course, seven game stages in the intermediate course, or ten game stages in the advanced course, as shown in FIG. 8. Therefore, the maximum number of game stages that can be cleared by the player is three (in the beginners' course), seven (in the intermediate course), or ten (in the advanced course).

Conversely, when the beginners' course (group of beginners' game stages) is cleared in multi-player mode, a player is granted the privilege to continue playing the next intermediate course (group of intermediate game stages). Similarly, when the intermediate course is cleared, a player is granted the privilege to continue playing the next advanced course (group of advanced game stages). Thus the maximum number of game stages that can be cleared by a player is: 3+7+10 =20.

Players who have better game skills tend to play more in single-player mode than in multi-player mode, and also their playing style is both elaborated and full of strategy. This leads to a state in which such a player will clear a large number of game stages for the payment of a small fee, tying up the game machine for a long time. It is also possible for such a player to occupy a game machine for several hours, after paying only the minimum fee.

Players with lesser game skills, on the other hand, tend to play more in multi-player mode than single-player mode, and also their play is clumsy. They tend to pay larger fees to clear game stages than when in single-player mode, and the likelihood that they will tie up the game machine for the payment of the minimum fee is extremely low.

This embodiment takes note of these circumstances and ensures that the maximum number of game stages that can be cleared by players is lower in single-player mode than in multi-player mode. This makes it possible to prevent the situation in which a player ties up a game machine for a long time for the payment of the minimum fee. On the other hand, the maximum number of game stages that can be cleared by players is set to be greater in multi-player mode than in single-player mode. This makes it possible to induce continued play in players who have selected multi-player mode, which is more likely to induce larger fees in a short time. As a result, the effective utilization ratio (the rate of return on the fee) of the game machine can be increased.

Note that the next course (group of game stages) granted by the play continuation privilege is preferably a course that is more difficult than the previous course. In other words, when the beginners' course has been cleared, the play continuation privilege for the intermediate course is granted, and when the intermediate course has been cleared, the play continuation privilege for the advanced course is granted. It is expected that players will pay more to clear the game stages in a course that is more difficult, even if the play continuation privilege is granted. In other words, granting the play continuation privilege ensures that, although the utilization ratio of the game machine will drop temporarily, the utilization ratio of the game machine will increase overall because the player will play the next course which is more difficult.

It is preferable that the play continuation privilege for the next course is granted to a player who has a superior game score (or game results in the broadest sense) amongst a plurality of players. For example, assume that player 2 has a better game score than player 1, as shown in a win/loss display 40 of FIG. 9. In this case, the configuration is such that player 2 is granted the play continuation privilege for the next course, as shown by a continuation privilege grant display 42. This makes it possible to give players a feeling of gratitude for receiving this play continuation privilege as a prize for obtaining a superior game score. It also makes it possible to prevent a situation in which a player feels uneasy about receiving the play continuation privilege.

It should be noted that, if the player with the superior score is always granted the play continuation privilege, players with inferior scores will lose interest in the game. It is therefore preferable that the play continuation privilege for the next course is granted to players with inferior game scores, at a given probability. This could be implemented by using a table such as that shown in FIG. 10, by way of example. In other words, VPD which is the difference between the number of won points of player 1 (hereinafter abbreviated to P1) and the number of won points of player 2 (hereinafter abbreviated to P2) is calculated, based on results data on the players. This VPD is then used to obtain LP1 and LP2, which are the probabilities that players 1 and 2 will be granted a play continuation privilege for the next course, from the table of FIG. 10. In the table of FIG. 10, the probability LP1 that player 1 will be granted the play continuation privilege increases with the quality of player 1's game score becomes better (VPD is bigger) and LP1 decreases as player 1's game score becomes worse (VPD is smaller). In other words, a player with a better game score is more likely to be granted the play continuation privilege, but a player with a poorer game score still has a certain probability of receiving this play continuation privilege, Alternatively, the play continuation privilege for the next course could be granted to all the players. If this is implemented, the utilization ratio of the game machine will drop temporarily. However, if a plurality of players play the next course for a long time, this could cancel this drop in the utilization ratio.

It is also possible to grant the play continuation privilege for the next course to a player with an inferior game score. Even if a player with an inferior game score is granted the play continuation privilege, it is highly likely that the game will once again be over within a short time, so that the temporary drop in the game machine due to the granting of the play continuation privilege can soon be cancelled.

Figure 9:
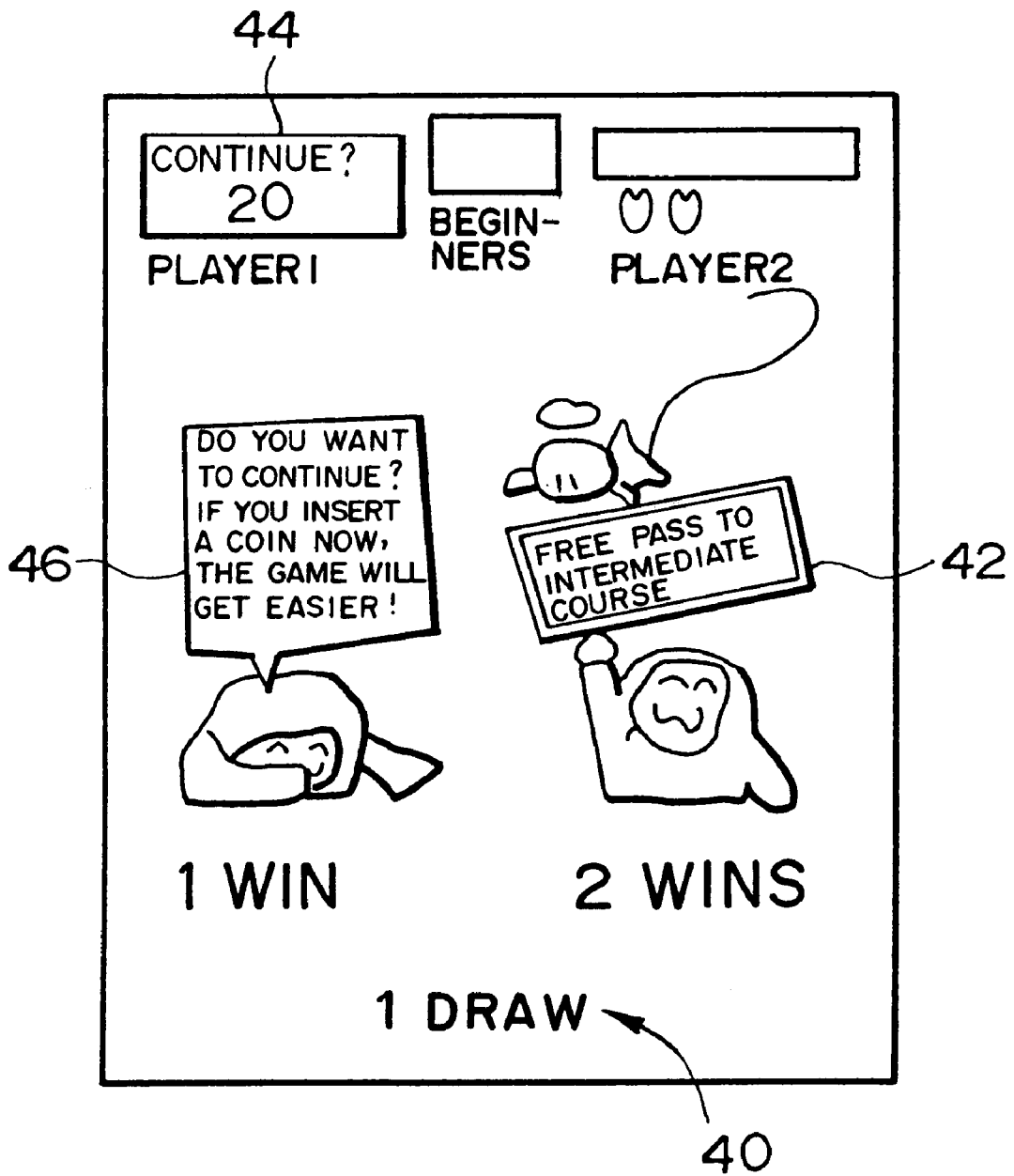
FIG. 9 is illustrative of a method of granting a continuation privilege for play in the next course to a player with a superior game score and a method of displaying encouragement to a player who has not been granted a play continuation privilege.

In FIG. 9, the play continuation privilege for the next course is granted to player 2, but it is not granted to player 1. It is also possible to configure the game machine to ensure that a continue display 44 is shown to player 2 who did not receive the play continuation privilege, so that player 2 can continue playing the next course on the insertion of a coin (fee).

In other words, player 2 who was granted the play continuation privilege for the next course will inevitably continue to play on the next course. Player 1, who was not granted the play continuation privilege, will have to observe the game until player 2 has finished playing, if no new coin is inserted. This will inevitably encourage player 1 to insert a coin and enjoy playing either competitively or cooperatively with player 2. As a result, multi-player play by players 1 and 2 will restart in the new course. This makes it possible to minimize the temporary drop in the utilization ratio of the game machine that is caused by the granting of the play continuation privilege to player 2 alone. On the other hand, player 1 will eventually insert a coin and continue playing the next course as described above, even if only player 2 is granted the play continuation privilege. It is therefore possible to achieve the quota of this embodiment of the invention, which is to induce players who select multi-player mode to continue playing, while minimizing the temporary drop in the utilization ratio of the game machine.

Note that an encouragement display 46 is shown to player 1 of FIG. 9, who was not granted the play continuation privilege for the next course, to induce the insertion of a coin for continued play. This makes it possible to give the players effective incentive to continue playing on the next course, thus inducing them to start again in multi-player mode.

Note that the encouragement display 46 is preferably a message such as: "If you insert a coin now, the game will get easier" or "If you insert a coin now, the quota will be reduced." This configuration makes it possible to further increase the incentive for players to continue playing. In addition, the players' competitive spirit can be stimulated and continued play can be induced indirectly, by showing the game score in the win/loss display 40, by way of example.

4. Detailed Processing Example

A detailed example of the processing of this embodiment of the invention will now be described with reference to the flowcharts shown in FIGS. 11 and 12.

Figure 11:
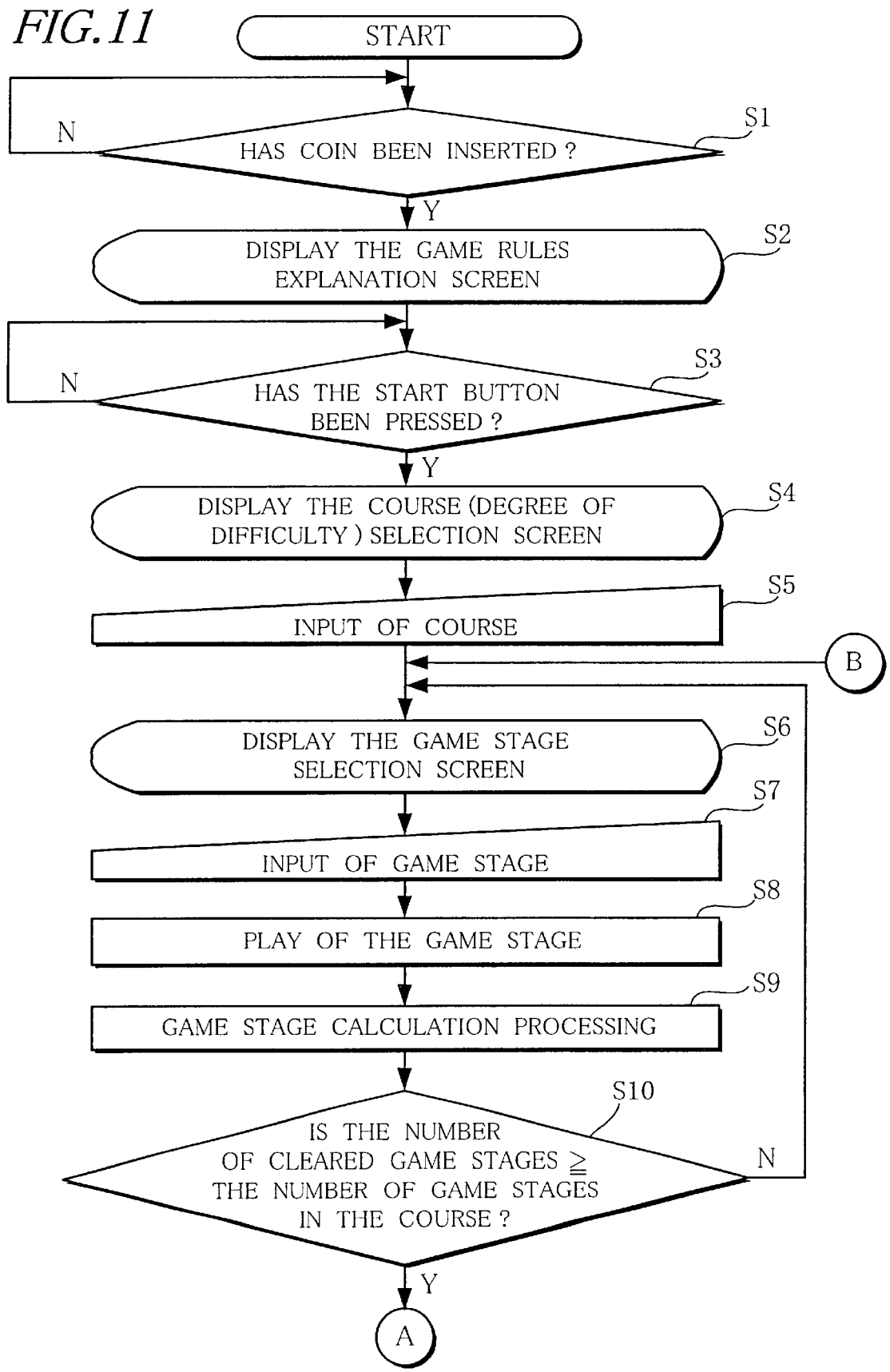
FIG. 11 shows an example of a flowchart of a detailed example of processing in accordance with this embodiment of the invention.

First of all, the system determines whether or not a player has inserted a coin (step S1), as shown in FIG. 11. When a coin has been inserted, a screen explaining the game rules is displayed, as shown in FIG. 2A (step S2). The system then determines whether or not a start button has been pressed (step S3). If it has been pressed, a screen for selecting the course (degree of difficulty) is displayed, as shown in FIG. 2B (step S4). When a course (beginners', intermediate, or advanced) is input by the player (step S5), the game stages that can be played by the player are displayed (step S6). When the game stage is input by the player (step S7), play starts in that game stage (step S8). When play ends in that game stage, game stage calculations are performed (step S9). In other words, the system determines whether or not the game stage has been cleared (whether or not the quota has been achieved) and then performs processing to not change the number of lives if it has been cleared, or reduce the number of lives if it has not been cleared. Further processing such as the calculation of the game scores of the players is performed.

The system then determines whether or not the number of cleared game stages is greater than or equal to the number of game stages in the course (step S10). In other words, it determines whether or not three game stages have been cleared for the beginners' course, seven game stages for the intermediate course, or then game stages for the advanced course, as shown in FIGS. 2B and 8. When the number of cleared game stages is less than the number of game stages in that course, the flow returns to step S6 and the player once again selects a game stage (or the game stage to be played next could be selected automatically by the computer).

Figure 12:
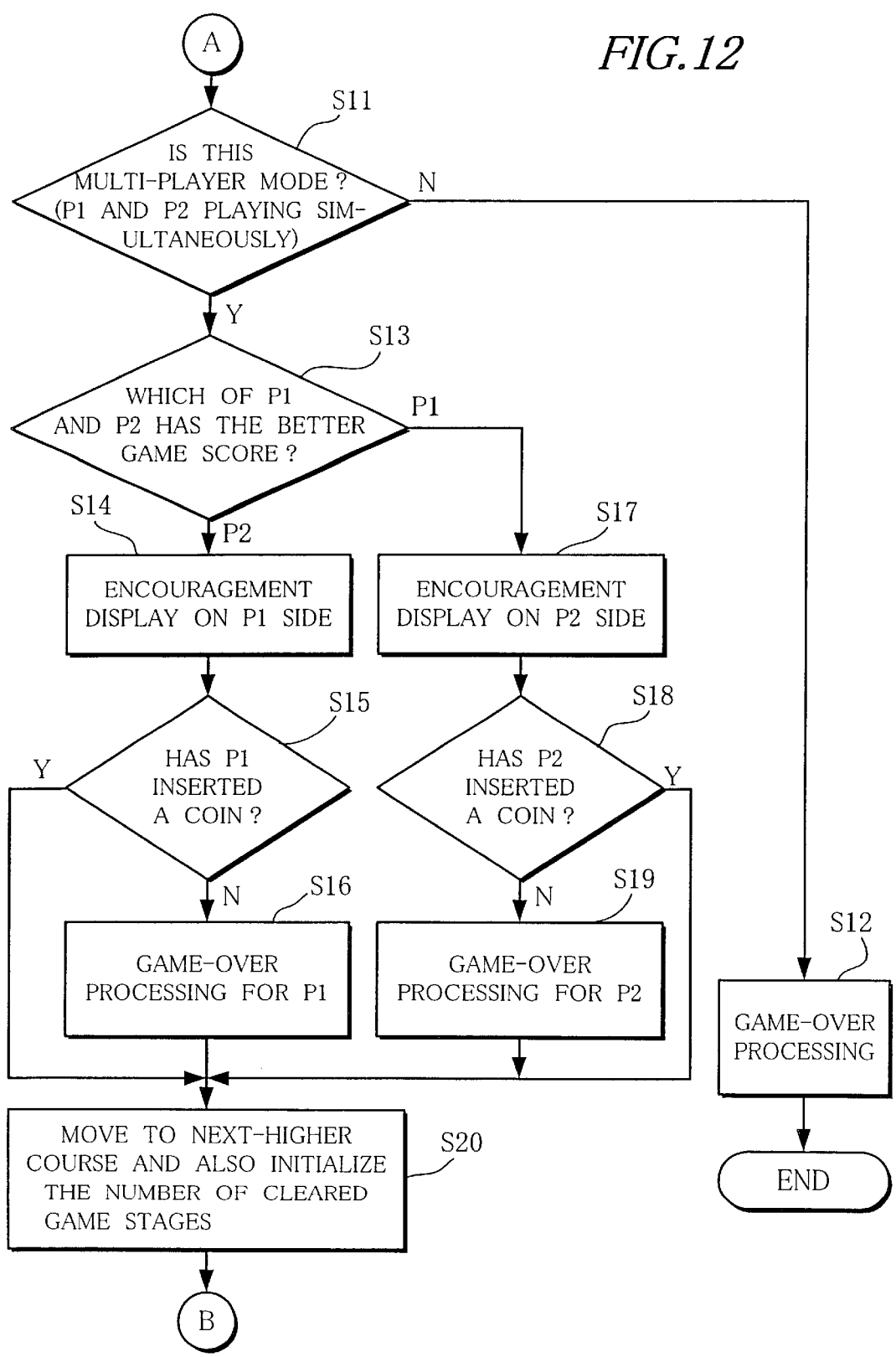
FIG. 12 continues the example of the flowchart of the detailed example of processing in accordance with this embodiment.

When the number of cleared game stages has reached the number of game stages in that course, on the other hand, the system determines whether or not multi-player mode is selected (whether or not players 1 and 2 are playing simultaneously) (step S11 in FIG. 12). When single-player mode is selected instead of multi-player mode, the game-over processing is performed as shown in FIGS. 6A and 6B (step S12). In other words, the game is forcibly ended when three game stages of the beginners' course are cleared, or seven game stages of the intermediate course, or ten game stages of the advanced course.

When it has been determined in step S11 that this is multi-player mode, the system then determines which of players 1 and 2 (P1 and P2) has the better game score (step S13). When it is determined that player 2 has the better game score, the encouragement display 46 is performed to invite the continued play in the next course by inserting a coin on the side of player (step S14). The system then determines whether or not player 1 has inserted a coin (step S15). If no coin has been inserted, the game is over for player 1 (step S16) and the flow proceeds to step S20. If a coin has been inserted, on the other hand, the game is not over for player 1 the flow proceeds to step S20.

If it was determined in step S13 that player 1 has the better game score, the encouragement display is performed on the side of player 2 (step S17), and the system determines whether or not player 2 has inserted a coin (step S18). If no coin has been inserted, the game is over for player 2 (step S19) and the processing proceeds to step S20. If a coin has been inserted, on the other hand, the game is not over for player 2 and the flow proceeds to step S20.

In step S20, the player is moved to the next-higher course (if the current course is the beginners' course, the next one is the intermediate course; and if the current course is the intermediate course, the next one is the advanced course), and also the number of game stages is initialized and the flow returns to step S6 of FIG. 11. If, for example, steps S16 and S19 have determined that the game is over for a player who has not been granted the play continuation privilege, the player who has received the play continuation privilege goes on to the next course alone. When steps S15 and S18 have determined that the player who has not been granted the play continuation privilege has inserted a coin, both players go on to the next course.

5. Hardware Configuration

Figure 13:
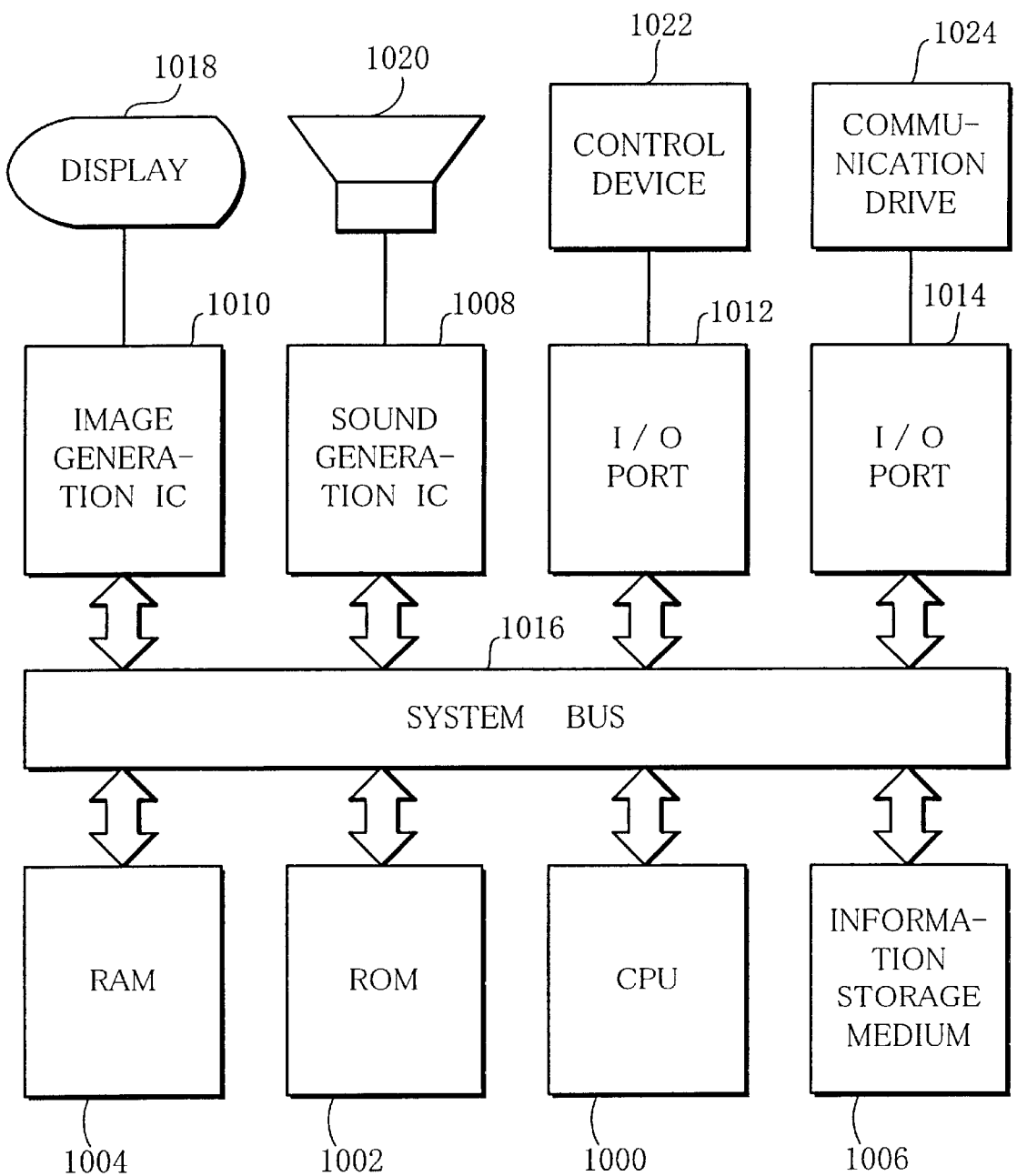
FIG. 13 shows an example of the configuration of hardware that can implement this embodiment.

The description now turns to an example of hardware that can implement the present invention, with reference to FIG. 13. In the machine shown in this figure, a CPU 1000, ROM 1002, RAM 1004, an information storage medium 1006, a sound generation IC 1008, an image generation IC 1010, and I/O ports 1012 and 1014 are connected together by a system bus 1016 in such a manner that data can be mutually transferred therebetween. A display 1018 is connected to the image generation IC 1010, a speaker 1020 is connected to the sound generation IC 1008, a control device 1022 is connected to the I/O port 1012, and a communication device 1024 is connected to the I/O port 1014.

The information storage medium 1006 is mainly used for storing program and image data, sound data, or the like for representing display objects. Means such as a DVD, game cassette, or CD-ROM could be used as an information storage medium for storing a game program and other data for a domestic game machine. Alternatively, memory such as ROM could be used for an arcade game machine, in which case the information storage medium 1006 is the ROM 1002.

The control device 1022 is equivalent to a game controller or operating panel and it is used as a device for inputting into the main unit of the device the results of decisions made by the player as the game progresses.

The CPU 1000 controls the entire system and processes data in accordance with the program stored in the information storage medium 1006, a system program (including initialization information for the entire system) stored in the ROM 1002, and signals input through the control device 1022. The RAM 1004 is a storage means that is used as a work area for the CPU 1000, and specific details from the information storage medium 1006 or the ROM 1002, or the results of calculations by the CPU 1000, are stored therein. A data configuration having a logical structure suitable for implementing this embodiment of the invention is constructed within this RAM or information storage medium.

The provision of the sound generation IC 1008 and the image generation IC 1010 in this type of system makes it possible to output game sounds and game images as required. The sound generation IC 1008 is an integrated circuit that generates game sounds such as sound effects and background music, based on information stored in the information storage medium 1006 or the ROM 1002, and the thus generated game sounds are output by the speaker 1020. The image generation IC 1010 is an integrated circuit that generates pixel information for output to the display 1018, based on image information that is sent from components such as the RAM 1004, the ROM 1002, and the information storage medium 1006. Note that a device called a head-mounted display (HMD) could also be used as the display 1018.

The communication device 1024 transfers various types of information used within the game system to and from external devices, and it is used to send given information in accordance with a game program when connected to another game system, or to send information such as a game program over a communication line.

The processing described with reference to FIGS. 1 to 10 is implemented by components such as the information storage medium 1006 that contains a program that performs the processing shown in the flowcharts of FIGS. 11 and 12, the CPU 1000 that operates in accordance with that program, and the image generation IC 1010 or the sound generation IC 1008. Note that the processing executed by the image generation IC 1010 and the sound generation IC 1008 could be performed in a software manner by means such as the CPU 1000 or a general-purpose DSP.

Figure 14A:
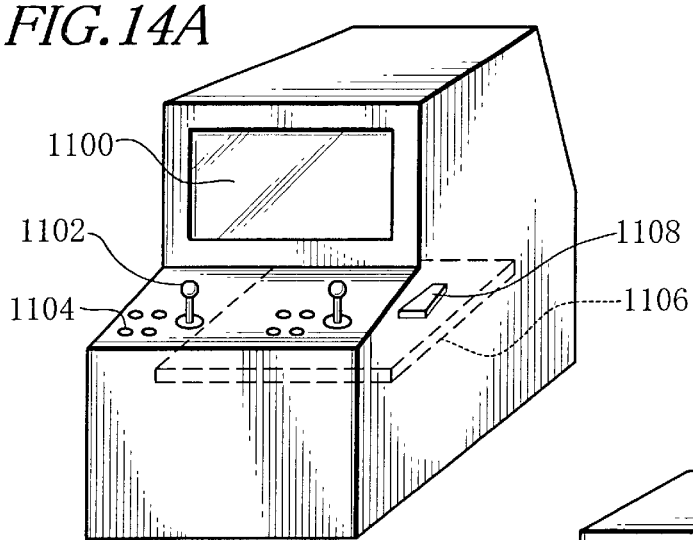
FIGS. 14A to 14C show examples of various devices to which this embodiment is applied.

An example of this embodiment applied to an arcade game machine is shown in FIG. 14A. A player enjoys this game by operating controls such as a joystick 1102 and buttons 1104 while viewing a game image shown on a display 1100. Components such as a CPU, an image generation IC, and a sound generation IC are mounted on an IC board 1106 incorporated into the game machine. Information is stored in a memory 1108, which is an information storage medium on the IC board 1106. This information includes information for performing game computations based on operation data that is input by a player using an operation means; information for generating at least one of game images and game sounds in accordance with the game computations; information for making the maximum number of game stages that can be cleared by players in a multi-player mode played by a plurality of players greater than the maximum number of game stages that can be cleared by a player in a single-player mode played by a single player; and information that is used when a game stage is divided into a plurality of groups of game stages, to ensure that, in single-player mode, the game is over for a player at the point at which one group of game stages from among a plurality of groups of game stages is cleared, but in multi-player mode, a continuation privilege that enables the continuation of play in the next group of game stages is granted to at least one player among a plurality of players, when one group of game stages from among a plurality of groups of game stages has been cleared. This information is hereinafter called stored information. This stored information comprises at least one type of information, such as program coding for executing the above described processing, image information, sound information, shape information for display objects, table data, list data, or player information.

Figure 14B:
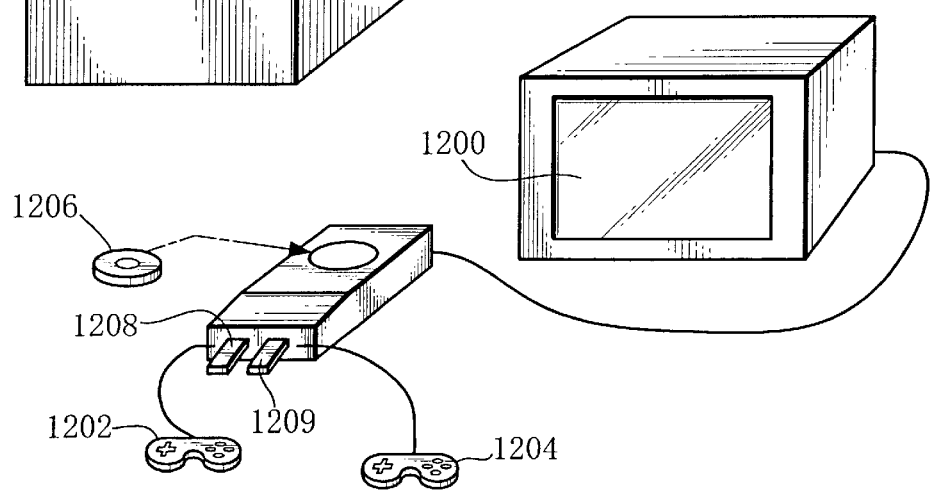

An example of this embodiment applied to a domestic game machine is shown in FIG. 14B. Players enjoy the game by operating game controllers 1202 and 1204 while viewing a game image shown on a display 1200. In this case, the above described stored information is stored in a CD-ROM 1206 or IC cards 1208 and 1209, which are information storage media that can be freely inserted into and removed from the main unit.

Figure 14C:
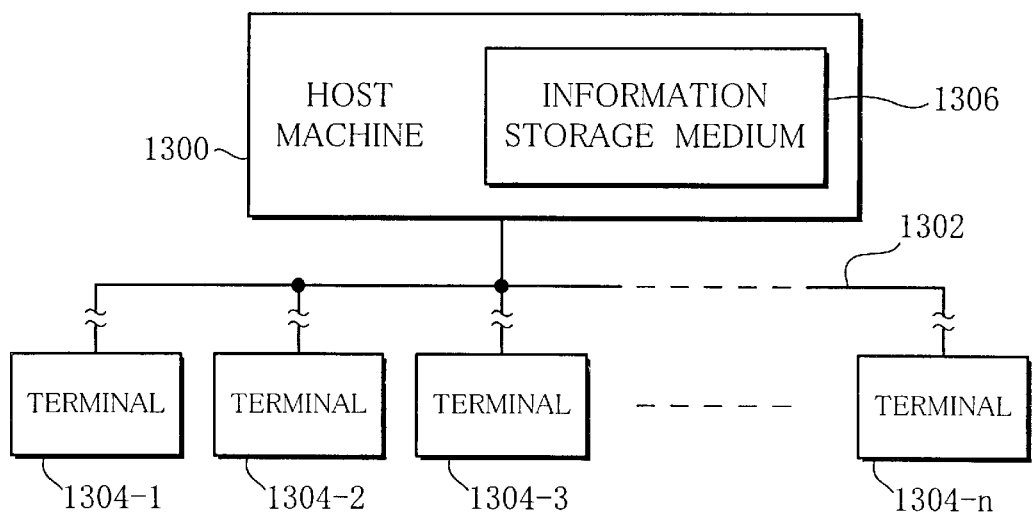

An example of this embodiment applied to a game machine is shown in FIG. 14C where the game machine comprises a host machine 1300 and terminals 1304-1 to 1304-*n* connected to the host machine 1300 by communication lines 1302. In this case, the above described stored information is stored in an information storage medium 1306 such as a magnetic disk device, magnetic tape device, or memory that can be controlled by the host machine 1300. In the case that each of the terminals 1304-1 to 1304-*n* has a CPU, an image generation IC, and a sound processing IC, and game images and sounds can be generated by the terminals 1304-1 to 1304-*n* in a stand-alone manner, means such as a game program for generating game images and sounds is transferred thereto from the host machine 1300. On the other hand, if they cannot be generated in a stand-alone manner by the terminals 1304-1 to 1304-*n*, the host machine 1300 creates the game images and sounds then transfers them to those terminals for output thereby.

Note that the present invention is not limited to the above-described embodiments and it can be modified in various ways.

For example, the method used to make the maximum number of game stages that can be cleared by players in multi-player mode greater than the maximum number of game stages that can be cleared by a player in single-player mode is most preferably that shown in FIG. 8 (a method of granting a play continuation privilege for the next group of game stages), but it is not limited thereto. For example, the number of game stages in each course in multi-player mode could be made greater than that in single-player mode. Alternatively, a game stage that cannot be seen in single-player mode could be inserted between one game stage and another game stage in multi-player mode.

In addition, the payment of a fee in accordance with the present invention is not limited to currency such as a coin, and thus the payment could also comprise other forms such as electronic money, pre-paid cards, post-payment cards, and credit cards. If game machines are connected by communication lines, it is particularly preferable that the form of payment is by electronic money.

The present invention is not limited to the games described herein and thus it can be applied to various other games such as sports games, hand-to-hand combat games, robot-battling games, role-playing games, shooting games, VS. games, and puzzle games.

The present invention is also not limited to arcade and domestic game machines; it can be applied to various other game systems such as simulators, large-scale attractions in which many players can participate, personal computers, multimedia terminals, and system boards that create game images.

What is claimed is:

1. A game machine for a multi-player type of game that enables a plurality of players to play, said game machine comprising:

means for performing a game computation, based on operation data that a player inputs by using an operation means;

means for generating at least one of a game image and a game sound in accordance with said game computation; and means for making a maximum number of game stages that can be cleared by players in a multi-player mode played by a plurality of players greater than a maximum number of game stages that can be cleared by a player in a single-player mode played by a single player.

2. The game machine as defined in claim 1, wherein, when game stages are divided into a plurality of groups of game stages:

in single-player mode, a game is over for a player at a point at which one group of game stages from among a plurality of groups of game stages is cleared; and in multi-player mode, a continuation privilege that enables a continuation of play in a next group of game stages is granted to at least one player among a plurality of players, when one group of game stages from among a plurality of groups of game stages has been cleared.

3. The game machine as defined in claim 2, wherein a continuation privilege that enables the continuation of play in the next group of game stages is granted to at least one player among a plurality of players, a continuation privilege that enables the continuation of play in the next group of game stages is not granted to another player, and game play is allowed to continue for said other player on condition that a fee is paid.

4. The game machine as defined in claim 3, wherein an encouragement screen is displayed to said other player who has not been granted said continuation privilege that enables the continuation of play in the next group of game stages, to induce a payment of a fee.

5. The game machine as defined in claim 2, wherein a continuation privilege that enables the continuation of play in a next group of game stages is granted to a player who has superior game results among said plurality of players.

6. The game machine as defined in claim 5, wherein said game play continuation privilege is also granted to a player who has inferior game results among said plurality of players, with a given probability.

7. The game machine as defined in claim 5, wherein a continuation privilege that enables the continuation of play in the next group of game stages is granted to at least one player among a plurality of players, a continuation privilege that enables the continuation of play in the next group of game stages is not granted to another player, and game play is allowed to continue for said other player on condition that a fee is paid.

8. The game machine as defined in claim 7, wherein an encouragement screen is displayed to said other player who has not been granted said continuation privilege that enables the continuation of play in the next group of game stages, to induce a payment of a fee.

9. The game machine as defined in claim 2, wherein said next group of game stages has a higher degree of difficulty than said one group of game stages.

10. The game machine as defined in claim 9, wherein a continuation privilege that enables the continuation of play in a next group of game stages is granted to a player who has superior game results among said plurality of players.

11. The game machine as defined in claim 10, wherein said game play continuation privilege is also granted to a player who has inferior game results among said plurality of players, with a given probability.

12. The game machine as defined in claim 9, wherein a continuation privilege that enables the continuation of play in the next group of game stages is granted to at least one player among a plurality of players, a continuation privilege that enables the continuation of play in the next group of game stages is not granted to another player, and game play is allowed to continue for said other player on condition that a fee is paid.

13. The game machine as defined in claim 12, wherein an encouragement screen is displayed to said other player who has not been granted said continuation privilege that enables the continuation of play in the next group of game stages, to induce a payment of a fee.

14. A computer-readable information storage medium for a multi-player type of game that enables a plurality of players to play, said information storage medium comprising:

information for performing a game computation based on operation data that is input by a player using an operation means;

information for generating at least one of a game image and a game sound in accordance with said game computation; and information for making a maximum number of game stages that can be cleared by players in a multi-player mode played by a plurality of players greater than a maximum number of game stages that can be cleared by a player in a single-player mode played by a single player.

15. The information storage medium as defined in claim 14, wherein, when game stages are divided into a plurality of groups of game stages:

in single-player mode, a game is over for a player at a point at which one group of game stages from among a plurality of groups of game stages is cleared; and in multi-player mode, a continuation privilege that enables a continuation of play in a next group of game stages is granted to at least one player among a plurality of players, when one group of game stages from among a plurality of groups of game stages has been cleared.

16. The information storage medium as defined in claim 15, wherein a continuation privilege that enables the continuation of play in the next group of game stages is granted to at least one player among a plurality of players, a continuation privilege that enables the continuation of play in the next group of game stages is not granted to another player, and game play is allowed to continue for said other player on condition that a fee is paid.

17. The information storage medium as defined in claim 16, wherein an encouragement screen is displayed to said other player who has not been granted said continuation privilege that enables the continuation of play in the next group of game stages, to induce a payment of a fee.

18. The information storage medium as defined in claim 15, wherein a continuation privilege that enables the continuation of play in a next group of game stages is granted to a player who has superior game results among said plurality of players.

19. The information storage medium as defined in claim 18, wherein said game play continuation privilege is also granted to a player who has inferior game results among said plurality of players, with a given probability.

20. The information storage medium as defined in claim 18, wherein a continuation privilege that enables the continuation of play in the next group of game stages is granted to at least one player among a plurality of players, a continuation privilege that enables the continuation of play in the next group of game stages is not granted to another player, and game play is allowed to continue for said other player on condition that a fee is paid.

21. The information storage medium as defined in claim 20, wherein an encouragement screen is displayed to said other player who has not been granted said continuation privilege that enables the continuation of play in the next group of game stages, to induce a payment of a fee.

22. The information storage medium as defined in claim 15, wherein said next group of game stages has a higher degree of difficulty than said one group of game stages.

23. The information storage medium as defined in claim 22, wherein a continuation privilege that enables the continuation of play in a next group of game stages is granted to a player who has superior game results among said plurality of players.

24. The information storage medium as defined in claim 23, wherein said game play continuation privilege is also granted to a player who has inferior game results among said plurality of players, with a given probability.

25. The information storage medium as defined in claim 22, wherein a continuation privilege that enables the continuation of play in the next group of game stages is granted to at least one player among a plurality of players, a continuation privilege that enables the continuation of play in the next group of game stages is not granted to another player, and game play is allowed to continue for said other player on condition that a fee is paid.

26. The information storage e medium as defined in claim 25, wherein an encouragement screen is displayed to said other player who has not been granted said continuation privilege that enables the continuation of play in the next group of game stages, to induce a payment of a fee.

* * * * *